United States Patent
Lee

(10) Patent No.: US 11,647,507 B2
(45) Date of Patent: May 9, 2023

(54) DEVICE AND METHOD FOR HANDLING PHYSICAL UPLINK CONTROL CHANNEL COLLISION

(71) Applicant: ACER INCORPORATED, New Taipei (TW)

(72) Inventor: Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 199 days.

(21) Appl. No.: 17/153,886

(22) Filed: Jan. 21, 2021

(65) Prior Publication Data

US 2021/0258947 A1   Aug. 19, 2021

Related U.S. Application Data

(60) Provisional application No. 62/976,357, filed on Feb. 14, 2020.

(51) Int. Cl.
*H04W 72/21* (2023.01)
*H04W 72/0446* (2023.01)

(52) U.S. Cl.
CPC ........ *H04W 72/21* (2023.01); *H04W 72/0446* (2013.01)

(58) Field of Classification Search
CPC ............... H04W 72/0413; H04W 72/0446
USPC .......................................... 370/336
See application file for complete search history.

(56) References Cited

U.S. PATENT DOCUMENTS

| 2012/0275425 A1* | 11/2012 | Li | H04W 52/20 |
| | | | 370/329 |
| 2019/0261391 A1 | 8/2019 | Kundu | |
| 2021/0022129 A1* | 1/2021 | Yuan | H04L 5/0057 |
| 2021/0120559 A1* | 4/2021 | Li | H04W 72/0413 |

FOREIGN PATENT DOCUMENTS

| WO | 2018/204513 A1 | 11/2018 |
| WO | 2019/060831 A1 | 3/2019 |
| WO | 2019/157713 A1 | 8/2019 |
| WO | 2019/160846 A1 | 8/2019 |
| WO | 2020/007340 A1 | 1/2020 |

* cited by examiner

*Primary Examiner* — Chi Tang P Cheng
(74) *Attorney, Agent, or Firm* — Winston Hsu

(57) ABSTRACT

A communication device for handling a physical uplink (UL) control channel (PUCCH) collision, comprises at least one storage device; and at least one processing circuit, coupled to the at least one storage device. The at least one storage device stores instructions, and the at least one processing circuit is configured to execute the instructions of transmitting a first PUCCH in at least one first physical resource block (PRB) of at least one first slot to a network; dropping a second PUCCH in at least one second PRB of at least one second slot, wherein the at least one second slot is overlapped with the at least one first slot; and transmitting the second PUCCH in at least one third PRB of at least one third slot to the network, wherein the at least one third slot is after the at least one first slot.

18 Claims, 14 Drawing Sheets

DEVICE AND METHOD FOR HANDLING PHYSICAL UPLINK CONTROL CHANNEL COLLISION

CROSS REFERENCE TO RELATED APPLICATIONS

This application claims the benefit of U.S. Provisional Application No. 62/976,357 filed on Feb. 14, 2020, which is incorporated herein by reference.

BACKGROUND OF THE INVENTION

1. Field of the Invention

The present invention relates to a device and a method used in a wireless communication system, and more particularly, to a device and a method of handling a physical uplink control channel collision.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage.

A LTE-advanced (LTE-A) system, as its name implies, is an evolution of the LTE system. The LTE-A system targets faster switching between power states, improves performance at the coverage edge of an evolved Node-B (eNB), increases peak data rate and throughput, and includes advanced techniques, such as carrier aggregation (CA), coordinated multipoint (CoMP) transmissions/reception, uplink (UL) multiple-input multiple-output (UL-MIMO), licensed-assisted access (LAA) (e.g., using LTE), etc.

A next generation radio access network (NG-RAN) is developed for further enhancing the LTE-A system. The NG-RAN includes one or more next generation Node-Bs (gNBs), and has properties of wider operation bands, different numerologies for different frequency ranges, massive MIMO, advanced channel codings, etc.

A user equipment (UE) may need to transmit multiple physical UL control channels (PUCCHs) in an overlapped time interval to the gNB. Accordingly, a PUCCH collision between the PUCCHs happens, and information included in the PUCCHs is broken. The gNB cannot receive the PUCCHs correctly. Thus, the PUCCH collision is a problem to be solved.

SUMMARY OF THE INVENTION

The present invention therefore provides a device and a method for handling physical uplink control channel collision to solve the abovementioned problem.

A communication device for handling a physical uplink (UL) control channel (PUCCH) collision, comprises at least one storage device; and at least one processing circuit, coupled to the at least one storage device. The at least one storage device stores instructions, and the at least one processing circuit is configured to execute the instructions of transmitting a first PUCCH in at least one first physical resource block (PRB) of at least one first slot to a network; dropping a second PUCCH in at least one second PRB of at least one second slot, wherein the at least one second slot is overlapped with the at least one first slot; and transmitting the second PUCCH in at least one third PRB of at least one third slot to the network, wherein the at least one third slot is after the at least one first slot.

A communication device for handling a physical uplink (UL) control channel (PUCCH) collision, comprises at least one storage device; and at least one processing circuit, coupled to the at least one storage device. The at least one storage device stores instructions, and the at least one processing circuit is configured to execute the instructions of transmitting a first PUCCH in at least one first physical resource block (PRB) of at least one first slot to a network; dropping the first PUCCH in at least one second PRB of at least one second slot; and transmitting a second PUCCH in at least one third PRB of at least one third slot to the network, wherein the at least one third slot is overlapped with the at least one second slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
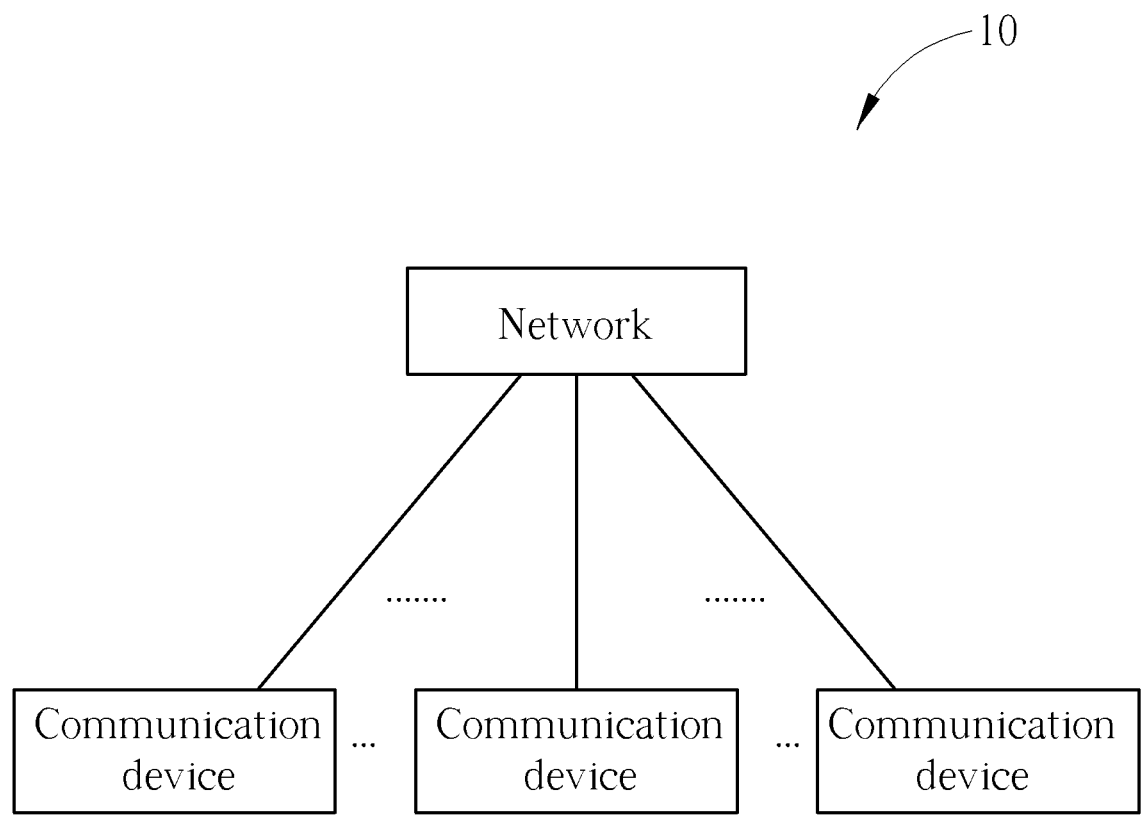
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The wireless communication system 10 may support a time-division duplexing (TDD) mode, a frequency-division duplexing (FDD) mode, a TDD-FDD joint operation mode or a licensed-assisted access (LAA) mode. That is, the network and a communication device may communicate with each other via FDD carrier(s), TDD carrier(s), licensed carrier(s) (licensed serving cell(s)) and/or unlicensed carrier(s) (unlicensed serving cell(s)). In addition, the wireless communication system 10 may support a carrier aggregation (CA). That is, the network and a communication device may communicate with each other via multiple serving cells (e.g., multiple serving carriers) including a primary cell (e.g., primary component carrier) and one or more secondary cells (e.g., secondary component carriers).

In FIG. 1, the network and the communication devices are simply utilized for illustrating the structure of the wireless communication system 10. Practically, the network may be a universal terrestrial radio access network (UTRAN) including at least one Node-B (NB) in a universal mobile telecommunications system (UMTS). In one example, the network may be an evolved UTRAN (E-UTRAN) including at least one evolved NB (eNB) and/or at least one relay node in a long term evolution (LTE) system, a LTE-Advanced (LTE-A) system, an evolution of the LTE-A system, etc. In one example, the network may be a next generation radio access network (NG-RAN) including at least one next generation Node-B (gNB) and/or at least one fifth generation (5G) base station (BS). In one example, the network may be any BS conforming to a specific communication standard to communicate with a communication device.

A NR is a standard defined for a 5G system (or 5G network) to provide a unified air interface with better performance. gNBs are deployed to realize the 5G system, which supports advanced features such as enhanced Mobile Broadband (eMBB), Ultra Reliable Low Latency Communications (URLLC), massive Machine Type Communications (mMTC), etc. The eMBB provides broadband services with a greater bandwidth and a low/moderate latency. The URLLC provides applications (e.g., end-to-end communication) with properties of a higher security and a low latency. The examples of the applications include an industrial internet, smart grids, infrastructure protection, remote surgery and an intelligent transportation system (ITS). The mMTC is able to support internet-of-things (IoT) of the 5G system which include billions of connected devices and/or sensors.

Furthermore, the network may also include at least one of the UTRAN/E-UTRAN/NG-RAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. In one example, after the network receives information transmitted by a communication device, the information may be processed only by the UTRAN/E-UTRAN/NG-RAN and decisions corresponding to the information are made at the UTRAN/E-UTRAN/NG-RAN. In one example, the UTRAN/E-UTRAN/NG-RAN may forward the information to the core network, and the decisions corresponding to the information are made at the core network after the core network processes the information. In one example, the information may be processed by both the UTRAN/E-UTRAN/NG-RAN and the core network, and the decisions are made after coordination and/or cooperation are performed by the UTRAN/E-UTRAN/NG-RAN and the core network.

A communication device may be a user equipment (UE), a low cost device (e.g., machine type communication (MTC) device), a device-to-device (D2D) communication device, a narrow-band internet of things (IoT) (NB-IoT), a mobile phone, a laptop, a tablet computer, an electronic book, a portable computer system, or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
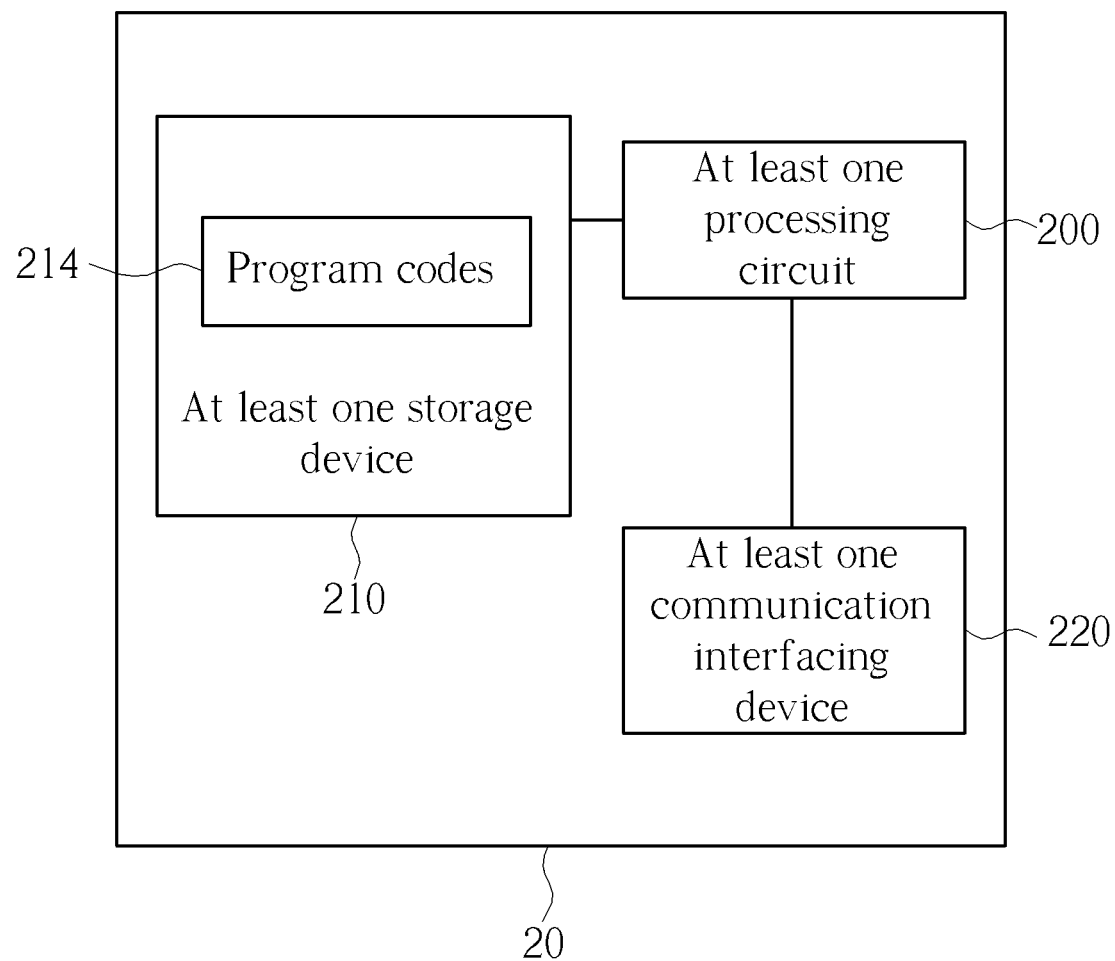
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

Figure 3:
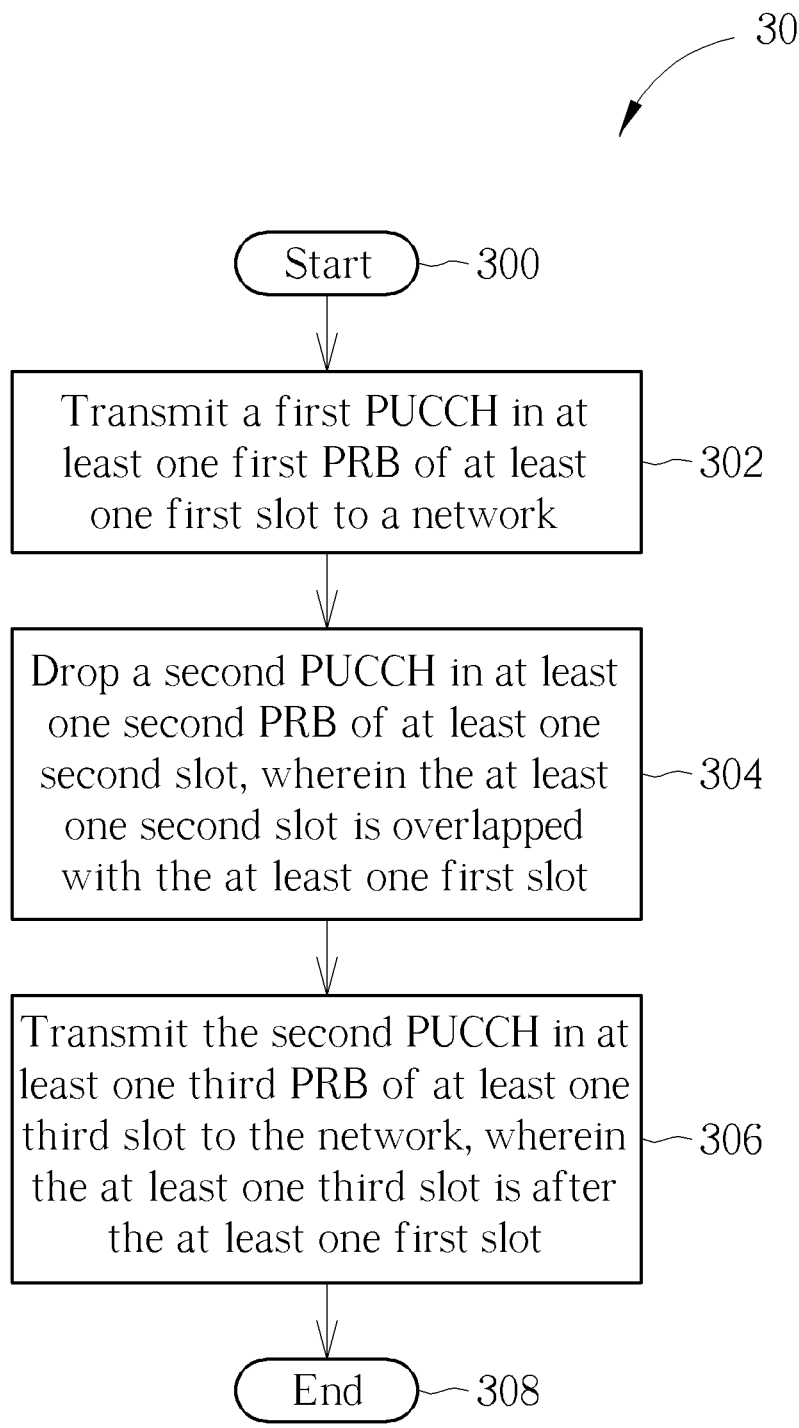
FIG. 3 is a flowchart of a process according to an example of the present invention.

FIG. 3 is a flowchart of a process 30 according to an example of the present invention. The process 30 may be utilized in a communication device, to handle a physical UL control channel (PUCCH) collision. The process 30 may be compiled into the program codes 214 and includes the following steps:

Step 300: Start.

Step 302: Transmit a first PUCCH in at least one first physical resource block (PRB) of at least one first slot to a network.

Step 304: Drop a second PUCCH in at least one second PRB of at least one second slot, wherein the at least one second slot is overlapped with the at least one first slot.

Step 306: Transmit the second PUCCH in at least one third PRB of at least one third slot to the network, wherein the at least one third slot is after the at least one first slot.

Step 308: End.

According to the process 30, the communication device transmits a first PUCCH in at least one first PRB of at least one first slot to a network. Then, the communication device drops a second PUCCH in at least one second PRB of at least one second slot, wherein the at least one second slot is overlapped with the at least one first slot. The communication device transmits the second PUCCH in at least one third PRB of at least one third slot to the network, wherein the at least one third slot is after (i.e., not overlapped with) the at least one first slot. That is, the first PUCCH which starts being transmitted at an earlier slot is transmitted completely, and the second PUCCH which starts being transmitted at a later slot is transmitted partially. Thus, the PUCCH collision occurs between the PUCCHs is solved according to the dropping rule in the process 30, and the network is able to receive both the PUCCHs correctly.

Realization of the process 30 is not limited to the above description. The following examples may be applied for realizing the process 30.

In one example, the second PUCCH collides with the first PUCCH in the at least one second slot. In one example, a first priority of the first PUCCH and a second priority of the second PUCCH are the same. In one example, a first priority of the first PUCCH is higher than a second priority of the second PUCCH.

In one example, a number of the at least one third PRB is determined according to at least one of a higher layer signal, a first coding rate of UL control information (UCI) in the second PUCCH, a second coding rate of the UCI with the PUCCH collision, a first number of PRBs configured for the second PUCCH, a second number of PRBs configured for the second PUCCH with the PUCCH collision or a number of slots configured for the second PUCCH.

In one example, the communication device transmits the second PUCCH in the at least one third PRB via a power boosting. That is, the communication device transmits the second PUCCH with a higher power level (e.g., higher than a power level of the second PUCCH which is determined without considering the collision with the first PUCCH), to improve signal quality of the at least one third PRB.

In one example, the at least one third PRB comprises all PRBs for the second PUCCH configured by the network. That is, the number of PRBs transmitted in the at least one third slot may be greater than the number of PRBs transmitted in the at least one first slot. In one example, the communication device further transmits the second PUCCH in at least one fourth PRB of at least one fourth slot to the network, wherein the at least one fourth slot is after (i.e., not overlapped with) the at least one first slot.

In one example, the step of transmitting the second PUCCH in the at least one third PRB of the at least one third slot to the network comprises dropping at least one first UCI in the second PUCCH in the at least one third PRB in the at least one third slot, and transmitting at least one second UCI in the second PUCCH in the at least one third PRB in the at least one third slot. That is, part of the UCI in the second PUCCH is dropped, while the rest of the UCI in the second PUCCH is transmitted. In one example, at least one first priority of the at least one first UCI is lower than at least one second priority of the at least one second UCI.

Figure 4:
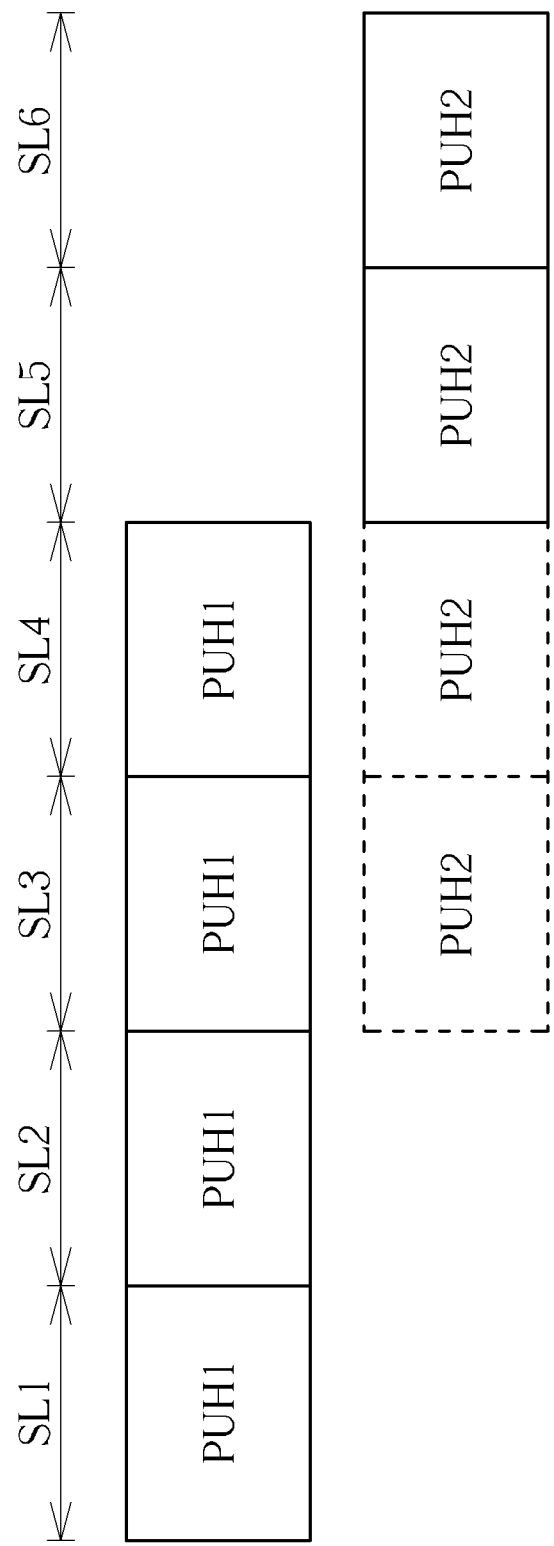
FIG. 4 is a schematic diagram of transmissions of PUCCHs according to an example of the present invention.

FIG. 4 is a schematic diagram of transmissions of PUCCHs according to an example of the present invention. The communication device transmits PUCCHs PUH1 and PUH2 in slots SL1-SL6 to the network. In detail, the communication device intends to transmit the PUCCH PUH1 in PRBs of the slots SL1-SL4 and to transmit the PUCCH PUH2 in PRBs of the slots SL3-SL6. Since the PUCCHs PUH1 and PUH2 are collided in the (overlapped) slots SL3 and SL4, the communication device drops the PUCCH PUH2 in the PRBs of the slots SL3 and SL4 according to the present invention. As a result, the communication device transmits the PUCCH PUH1 in the slots SL1-SL4 and transmits the PUCCH PUH2 in the slots SL5-SL6. Thus, the problem of the PUCCH collision is solved.

Figure 5:
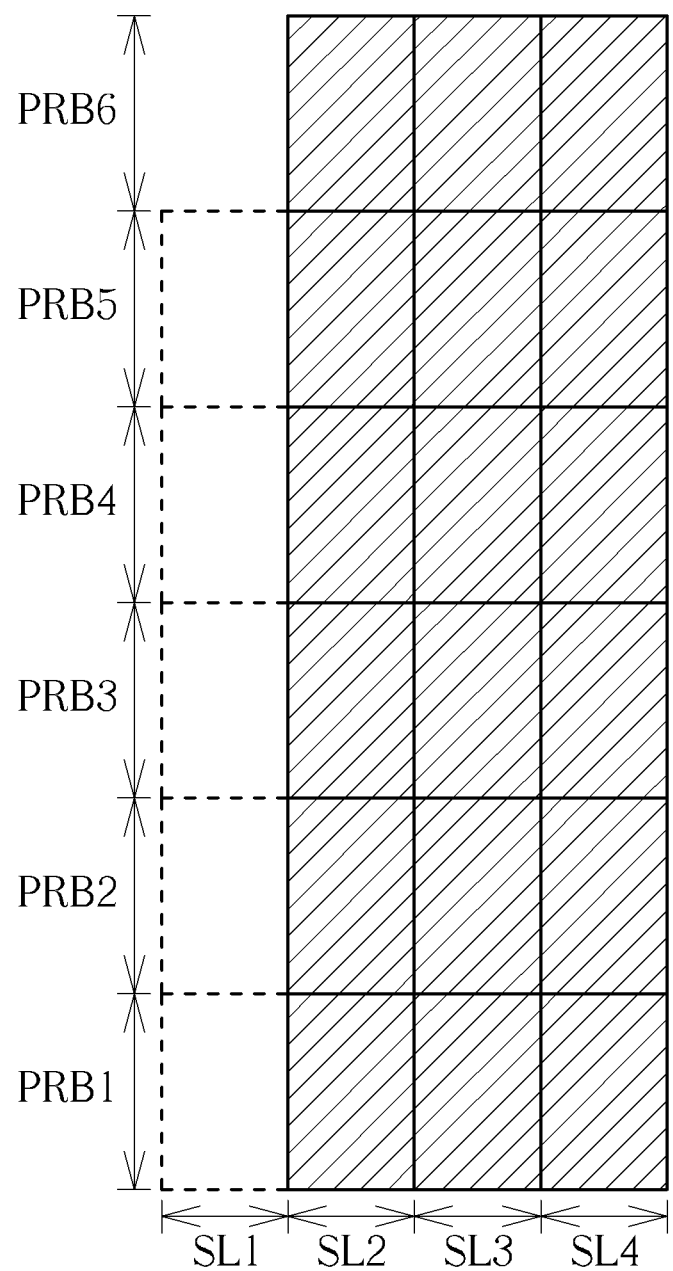
FIG. 5 is a schematic diagram of PRBs of a PUCCH according to an example of the present invention.

FIG. 5 is a schematic diagram of PRBs of a PUCCH according to an example of the present invention. In the present example, the communication device intends to transmit a PUCCH in PRBs PRB1-PRB5 of slots SL1-SL4. Since the PUCCH is collided with the other PUCCH in the slot SL1, the communication device drops the PUCCH in PRBs PRB1-PRB5 of the slot SL1, and transmits the PUCCH in the PRBs PRB1-PRB5 of the slots SL2-SL4. In one example, the communication device may transmit the PUCCH in a PRB PRB6 in the slots SL2-SL4, to reduce effect caused by dropping the PRBs PRB1-PRB5 in the slot SL1. In one example, the communication device may transmit the PUCCH in the PRBs PRB1-PRB5 in the slots SL2-SL4 via a power boosting, to reduce the effect caused by the dropping. Thus, reception quality of the PUCCH is improved.

In one example, the number of PRBs for the second PUCCH may be configured by a higher layer signal (e.g., nrofPRBs). For example, the number of PRBs for the second PUCCH may be determined according to the number of UCI bits. In one example, the number of PRBs ($M_{RB,min}^{PUCCH}$) for the second PUCCH may be determined according to at least one of the following factors.

(1) A value r (e.g., a maximum coding rate for UCI) configured by the network for the second PUCCH.

(2) A (e.g., maximum) number of PRBs ($M_{RB}^{PUCCH}$) for PUCCH resource configured by the network (e.g., nrof-PRBs) for the second PUCCH.

(3) A (e.g., maximum) number of slots ($N_{PUCCH}^{repeat}$) configured by the network for the second PUCCH.

(4) A number of slots ($n_{PUCCH}^{repeat}$, $n_{PUCCH}^{repeat} \leq N_{PUCCH}^{repeat}$) for transmitting the second PUCCH, after applying the dropping rule.

In one example, after applying the dropping rule, the communication device may transmit the second PUCCH in remaining slot(s) with a higher transmission power (e.g., a power boost P-dB higher than an original transmission power level or using a maximum transmission power level configured for a serving cell of the network). The value P may be a fixed value, may be configured by a higher layer signaling, or may be determined according to $n_{PUCCH}^{repeat}$ and/or $N_{PUCCH}^{repeat}$.

In one example, the number of PRBs ($M_{RB,min}^{PUCCH}$) for the second PUCCH may be determined according to the following equations:

$$(O_{UCI}+O_{CRC}) \cdot N_{PUCCH}^{repeat} \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 1)}$$

$$(O_{UCI}+O_{CRC}) \cdot N_{PUCCH}^{repeat} > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \quad \text{if}$$
$$M_{RB}^{PUCCH} > 1. \quad \text{(Eq. 2)}$$

$O_{UCI}$ is a total number of UCI bits. $O_{CRC}$ is a number of cyclic redundancy check (CRC) bits. $M_{SC,ctrl}^{PUCCH}$ is a number of subcarriers for a PUCCH per resource block. $M_{symb-UCI}^{PUCCH}$ is equal to a number of PUCCH symbols in a slot. $Q_m$ is a modulation scheme, e.g., $Q_m=1$ if pi/2-BPSK is the modulation scheme, and $Q_m=2$ if QPSK is the modulation scheme. The communication device may transmit the PUCCH in $M_{RB}^{PUCCH}$ PRBs, if the equation (Eq. 2) is satisfied with $M_{RB,min}^{PUCCH}=M_{RB}^{PUCCH}$.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 3)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \quad \text{if}$$
$$M_{RB}^{PUCCH} > 1. \quad \text{(Eq. 4)}$$

The communication device may transmit the PUCCH in $M_{RB}^{PUCCH}$ PRBs, if the equation (Eq. 4) is satisfied with $M_{RB,min}^{PUCCH}=M_{RB}^{PUCCH}$.

In one example, the number of PRBs ($M_{RB,min}^{PUCCH}$) for the second PUCCH may be determined according to at least one of the following factors.

(1) A value r (e.g., a maximum coding rate for UCI) configured by the network for the second PUCCH.

(2) A value r2 (e.g., a maximum coding rate for UCI) for the second PUCCH, if the PUCCH collision occurs.

(3) A (e.g., maximum) number of PRBs ($M_{RB}^{PUCCH}$) for PUCCH resource configured by the network (e.g., nrof-PRBs) for the second PUCCH.

(4) A (e.g., maximum) number of slots ($N_{PUCCH}^{repeat}$) configured by the network for the second PUCCH.

(5) A number of slots ($n_{PUCCH}^{repeat}$, $n_{PUCCH}^{repeat} \leq N_{PUCCH}^{repeat}$) for transmitting the second PUCCH, after applying the dropping rule.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot r2; \quad \text{(Eq. 5)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot r2, \text{ if } M_{RB}^{PUCCH} > 1. \quad \text{(Eq. 6)}$$

The definitions of the parameters in the equations can be referred to the previous description, and is not narrated herein. In one example, the value r2 may be configured by a higher layer signaling. In one example, the value r2 may be determined according at least one of r, $M_{RB}^{PUCCH}$, $N_{PUCCH}^{repeat}$, $n_{PUCCH}^{repeat}$ or a value configured by a higher layer signaling. The communication device may transmit the PUCCH in $M_{RB}^{PUCCH}$ PRBs, if the equation (Eq. 6) is satisfied with $M_{RB,min}^{PUCCH}=M_{RB}^{PUCCH}$.

In one example, the number of PRBs ($M_{RB,min}^{PUCCH}$) for the second PUCCH may be determined according to at least one of the following factors.

(1) A value r (e.g., a maximum coding rate for UCI) configured by the network for the second PUCCH.

(2) A (e.g., maximum) number of PRBs ($M_{RB}^{PUCCH}$) for PUCCH resource configured by the network (e.g., nrof-PRBs) for the second PUCCH.

(3) A (e.g., maximum) number of PRB ($M_{RB2}^{PUCCH}$) for PUCCH resource configured by the network (e.g., nrof-PRBs2) for the second PUCCH, if the PUCCH collision occurs. nrofPRBs2 may be configured by a radio resource control (RRC) signaling or may be determined according to a factor (e.g., f of a RRC configuration or a fixed value) and nrofPRBs (e.g., nrofPRBs2=f·nrofPRBs).

(4) A (e.g., maximum) number of slots ($N_{PUCCH}^{repeat}$) configured by the network (e.g., nrofSlots) for the second PUCCH.

(5) A number of slots ($n_{PUCCH}^{repeat}$, $n_{PUCCH}^{repeat} \leq N_{PUCCH}^{repeat}$) for transmitting the second PUCCH, after applying the dropping rule.

In one example, the number of PRBs ($M_{RB,min}^{PUCCH}$) for the second PUCCH may be determined according to the following equations:

$$(O_{UCI}+O_{CRC}) \cdot N_{PUCCH}^{repeat} \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 7)}$$

$$(O_{UCI}+O_{CRC}) \cdot N_{PUCCH}^{repeat} > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \text{ if } M_{RB}^{PUCCH} > 1. \quad \text{(Eq. 8)}$$

The definitions of the parameters in the equations can be referred to the previous description, and is not narrated herein. The communication device may transmit the PUCCH in $M_{RB2}^{PUCCH}$ PRBs, if the equation (Eq. 8) is satisfied with $M_{RB,min}^{PUCCH}=M_{RB2}^{PUCCH}$.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 9)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \text{ if } M_{RB}^{PUCCH} > 1. \quad \text{(Eq. 10)}$$

The definitions of the parameters in the equations can be referred to the previous description, and is not narrated herein. The communication device may transmit the PUCCH in $M_{RB2}^{PUCCH}$ PRBs, if the equation (Eq. 10) is satisfied with $M_{RB,min}^{PUCCH}=M_{RB2}^{PUCCH}$.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot r; \quad \text{(Eq. 11)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot r, \text{ if } M_{RB}^{PUCCH} > 1. \quad \text{(Eq. 12)}$$

The definitions of the parameters in the equations can be referred to the previous description, and is not narrated herein. The communication device may transmit the PUCCH in $M_{RB2}^{PUCCH}$ PRBs, if the equation (Eq. 12) is satisfied with $M_{RB,min}^{PUCCH}=M_{RB2}^{PUCCH}$.

In one example, the number of PRBs ($M_{RB,min}^{PUCCH}$) for the second PUCCH may be determined according to at least one of the following factors.

(1) A value r (e.g., a maximum coding rate for UCI) configured by the network for the second PUCCH.

(2) A (e.g., maximum) number of PRBs ($M_{RB}^{PUCCH}$) for PUCCH resource configured by the network (e.g., nrof-PRBs) for the second PUCCH starting at the later slot.

(3) A (e.g., maximum) number of slots ($N_{PUCCH}^{repeat2}$) configured by the network (e.g., nrofSlots2) for the second PUCCH, if the PUCCH collision occurs. nrofSlots2 may be configured by a RRC signaling, or may be determined according to a factor (e.g., g of a RRC configuration or a fixed value) and nrofSlots (e.g., nrofSlots2=g·nrofSlots).

(4) A number of slots ($n_{PUCCH}^{repeat}$, $n_{PUCCH}^{repeat} \leq N_{PUCCH}^{repeat}$) for transmitting the second PUCCH, after applying the dropping rule.

In one example, the number of PRBs ($M_{RB,min}^{PUCCH}$) for the second PUCCH may be determined according to the following equations:

$$(O_{UCI}+O_{CRC}) \cdot N_{PUCCH}^{repeat2} \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 13)}$$

$$(O_{UCI}+O_{CRC}) \cdot N_{PUCCH}^{repeat2} > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \text{ if } M_{RB}^{PUCCH} > 1. \quad \text{(Eq. 14)}$$

The definitions of the parameters in the equations can be referred to the previous description, and is not narrated herein. The communication device transmits the PUCCH in $M_{RB2}^{PUCCH}$ PRBs, if the equation (Eq. 14) is satisfied with $M_{RB,min}^{PUCCH}=M_{RB2}^{PUCCH}$.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot n_{PUCCH}^{repeat} \cdot r; \quad \text{(Eq. 15)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot n_{PUCCH}^{repeat} \cdot r, \text{ if } M_{RB}^{PUCCH} > 1. \quad \text{(Eq. 16)}$$

The definitions of the parameters in the equations can be referred to the previous description, and is not narrated herein. The communication device may transmit the PUCCH in $M_{RB2}^{PUCCH}$ PRBs, if the equation (Eq. 16) is satisfied with $M_{RB,min}^{PUCCH}=M_{RB}^{PUCCH}$.

In one example, the number of PRBs ($M_{RB,min}^{PUCCH}$) for the second PUCCH may be determined according to the following equations:

$$(O_{UCI}+O_{CRC}) \leq M_{RB,min}^{PUCCH} \cdot M_{SC,ctrl}^{PUCCH} \cdot M_{symb-UCI}^{PUCCH} \cdot Q_m \cdot r; \quad \text{(Eq. 17)}$$

$$(O_{UCI}+O_{CRC}) > (M_{RB,min}^{PUCCH}-1) \cdot M_{SC,ctrl}^{PUCCH} \cdot M_{symb-UCI}^{PUCCH} \cdot Q_m \cdot r, \text{ if } M_{RB}^{PUCCH} > 1. \quad \text{(Eq. 18)}$$

The definitions of the parameters in the equations can be referred to the previous description, and is not narrated herein. The communication device may transmit the PUCCH in $M_{RB2}^{PUCCH}$ PRBs, if the equation (Eq. 18) is satisfied with $M_{RB,min}^{PUCCH}=M_{RB}^{PUCCH}$.

In one example, a number of bits of UCI may be further reduced according to at least one of the following methods.

(1) Hybrid automatic repeat request (HARQ) bundling: bundling among multiple HARQs for multiple transport blocks (TB)s or bundling among multiple HARQs (for multiple CBGs) of a TB.

(2) A number of positive acknowledgements (ACKs) for replacing per-TB HARQ information.

In one example, the communication device drops the UCI according to priorities of the UCI, i.e., UCI with a lower priority is dropped first. In one example, priorities of the UCI from high to low may be a scheduling request, a HARQ, wideband channel state information (CSI), subband CSI.

Figure 6:
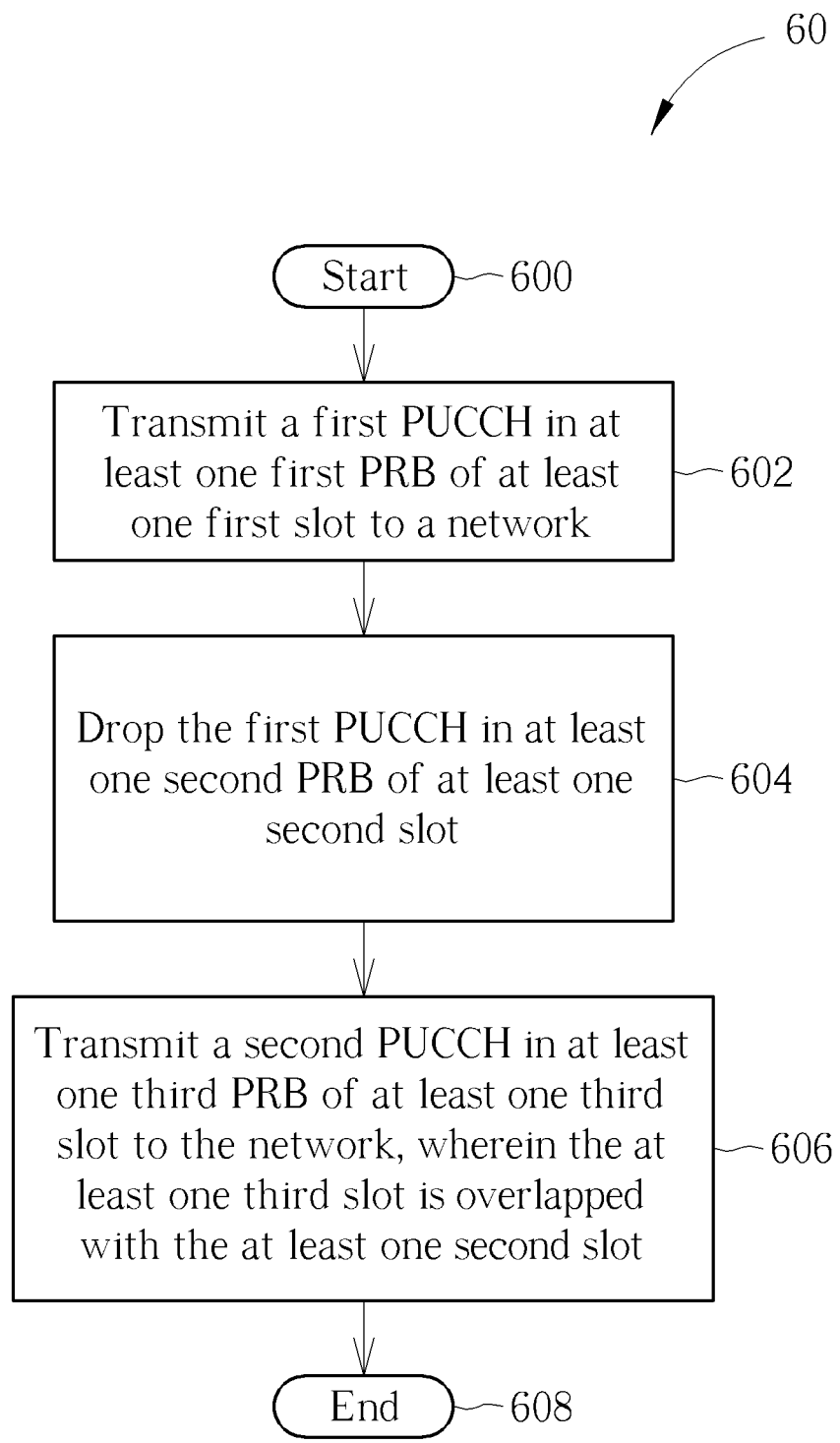
FIG. 6 is a flowchart of a process according to an example of the present invention.

FIG. 6 is a flowchart of a process 60 according to an example of the present invention. The process 60 may be utilized in a communication device, to handle a PUCCH collision. The process 60 may be compiled into the program codes 214 and includes the following steps:

Step 600: Start.

Step 602: Transmit a first PUCCH in at least one first PRB of at least one first slot to a network.

Step 604: Drop the first PUCCH in at least one second PRB of at least one second slot.

Step 606: Transmit a second PUCCH in at least one third PRB of at least one third slot to the network, wherein the at least one third slot is overlapped with the at least one second slot.

Step 608: End.

According to the process 60, the communication device transmits a first PUCCH in at least one first PRB of at least one first slot to a network. Then, the communication device drops the first PUCCH in at least one second PRB of at least one second slot. The communication device transmits a second PUCCH in at least one third PRB of at least one third slot to the network, wherein the at least one third slot is overlapped with the at least one second slot. That is, the first PUCCH which starts being transmitted at an earlier slot is transmitted partially, and the second PUCCH which starts being transmitted at a later slot is transmitted completely. Thus, the PUCCH collision occurs between the PUCCHs is solved according to the dropping rule of the process 70, and the network is able to receive both the PUCCHs correctly.

Realization of the process 60 is not limited to the above description. The following examples may be applied for realizing the process 60.

In one example, the second PUCCH collides with the first PUCCH in the at least one second slot. In one example, the communication device drops the second PUCCH in at least one fourth PRB of at least one fourth slot, wherein the at least one fourth slot is overlapped with the at least one first slot and is before the at least one third slot. In one example, the second PUCCH collides with the first PUCCH in the at least one fourth slot. In one example, a first priority of the first PUCCH and a second priority of the second PUCCH are the same. In one example, a first priority of the first PUCCH is lower than a second priority of the second PUCCH. In one example, the communication device drops the first PUCCH in the at least one second PRB in the at least one second slot according to a processing time of the second PUCCH or a periodicity of the second PUCCH. In one example, the communication device drops the first PUCCH in the at least one second PRB in the at least one second slot according to according to at least one of a coding rate of UCI in the first PUCCH, a number of PRBs configured for the first PUCCH or a number of slots configured for the first PUCCH.

In one example, the communication device drops the first PUCCH in the at least one second PRB in the at least one second slot according to at least one of a coding rate of UCI in the second PUCCH, a number of PRBs configured for the second PUCCH, or a number of slots configured for the second PUCCH.

In one example, the step of transmitting the first PUCCH in the at least one first PRB of the at least one first slot to the network comprises dropping at least one first UCI in the first PUCCH in the at least one first PRB in the at least one first slot, and transmitting at least one second UCI in the first PUCCH in the at least one first PRB in the at least one first slot. In one example, at least one first priority of the at least one first UCI is lower than at least one second priority of the at least one second UCI.

In one example, the step of transmitting the second PUCCH in the at least one third PRB of the at least one third slot to the network comprises dropping at least one third UCI in the second PUCCH in the at least one third PRB in the at least one third slot, and transmitting at least one fourth UCI in the second PUCCH in the at least one third PRB in the at least one third slot. In one example, at least one third priority of the at least one third UCI is lower than at least one fourth priority of the at least one fourth UCI.

In one example, the communication device transmits the first PUCCH and the second PUCCH according to at least one of the following factors.

(1) A value r (e.g., a maximum coding rate for UCI) configured by the network for the first PUCCH.

(2) A (e.g., maximum) number of PRBs ($M_{RB}^{PUCCH}$) configured by the network (e.g., nrofPRBs) for the first PUCCH.

(3) A (e.g., maximum) number of slots ($N_{PUCCH}^{repeat}$) configured by the network for the first PUCCH.

(4) A number of slots for ($n_{PUCCH}^{repeat}$, $n_{PUCCH}^{repeat} \leq N_{PUCCH}^{repeat}$) transmitting the first PUCCH, before a slot n.

In one example, the communication device determines whether to transmit the first PUCCH in a slot n according to the following rule. If $(O_{UCI}+O_{CRC}) \cdot N_{PUCCH}^{repeat} \leq M_{RB}^{PUCCH} \cdot M_{SC,ctrl}^{PUCCH} \cdot M_{symb-UCI}^{PUCCH} \cdot Q_m \cdot n_{PUCCH}^{repeat} \cdot r$, the communication device does not transmit the first PUCCH in the slot n. Otherwise, the communication device transmits the first PUCCH in the slot n.

In one example, the communication device determines whether to transmit the first PUCCH in a slot n according to the following rule. If $(O_{UCI}+O_{CRC}) \leq M_{RB}^{PUCCH}-1) \cdot M_{SC,ctrl}^{PUCCH} \cdot M_{symb-UCI}^{PUCCH} \cdot Q_m \cdot n_{PUCCH}^{repeat} \cdot r$, the communication device does not transmit the first PUCCH in the slot n. Otherwise, the communication device transmits the first PUCCH in the slot n.

Figure 7:
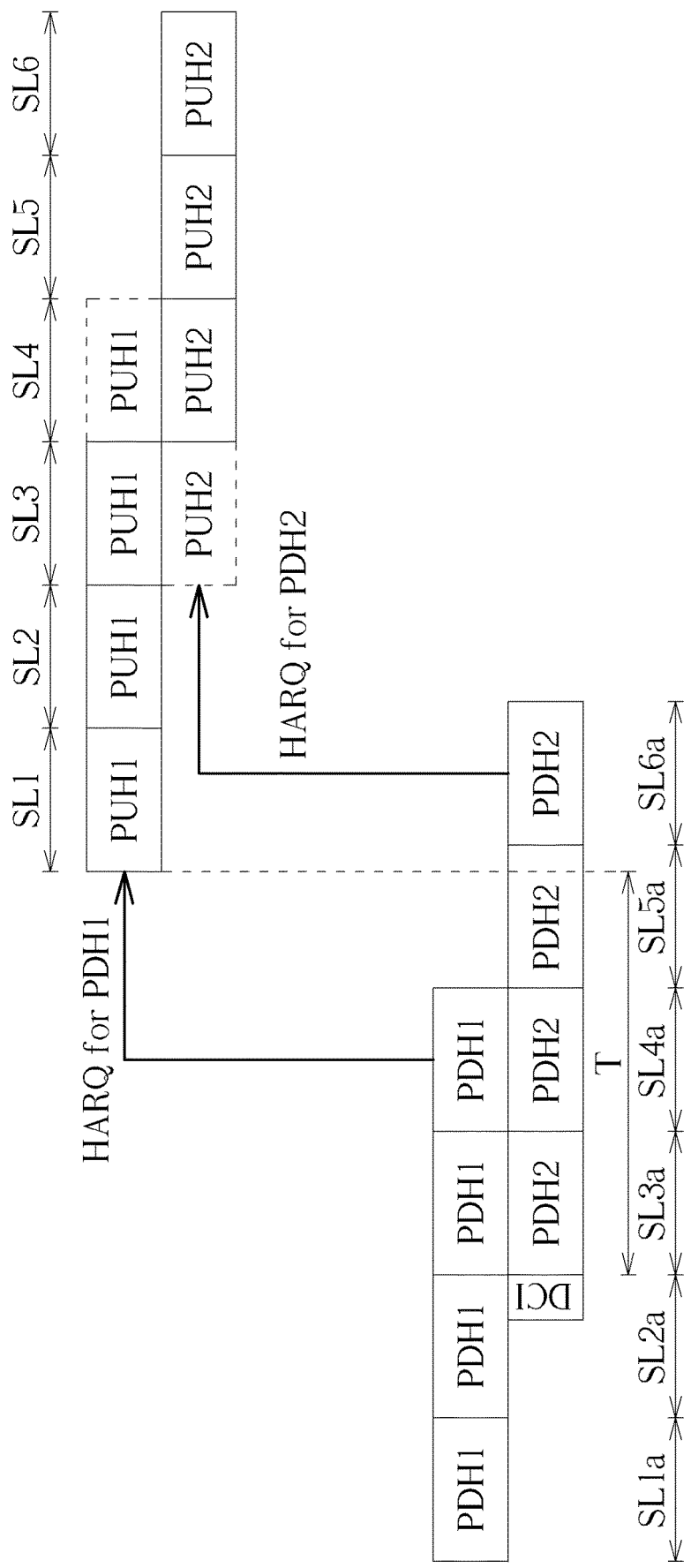
FIG. 7 is a schematic diagram of transmissions of PUCCHs according to an example of the present invention.

FIG. 7 is a schematic diagram of transmissions of PUCCHs according to an example of the present invention. The communication device receives physical DL shared channels (PDSCHs) PDH1 and PDH2 in slots SL1a-SL6a from the network. The PDSCHs PDH 1 and PDH2 may be transmitted by different serving cells. Correspondingly, the communication device transmits HARQs of the PDSCHs PDH1 and PDH2 in PUCCHs PUH1 and PUH2 in slots SL1-SL6 to the network. In detail, the communication device intends to transmit the HARQ for the PDSCH PDH1 in PRBs of the slots SL1-SL4 and to transmit the HARQ for the PDSCH PDH2 in PRBs of the slots SL3-SL6. If a time interval T between a reception time of DCI in the slot SL2a and a transmission time of the PUCCH PUH1 in the slot SL1 is greater than a processing time for preparing the PUCCH PUH1 and for performing a blind detection of DL control information (DCI) of the PDSCH PDH2, the communication device can determine how to drop parts of the PUCCHs PUH1 and PUH2. In the present example, the communication device drops the PUCCH PUH1 in the PRBs of the slot SL4 and the PUCCH PUH2 in the PRBs of the slot SL3, and transmits the PUCCH PUH1 in the PRBs of the slots SL1-SL3 and the PUCCH PUH2 in the PRBs of the slots SL4-SL6. Thus, the problem of the PUCCH collision is solved.

Figure 8:
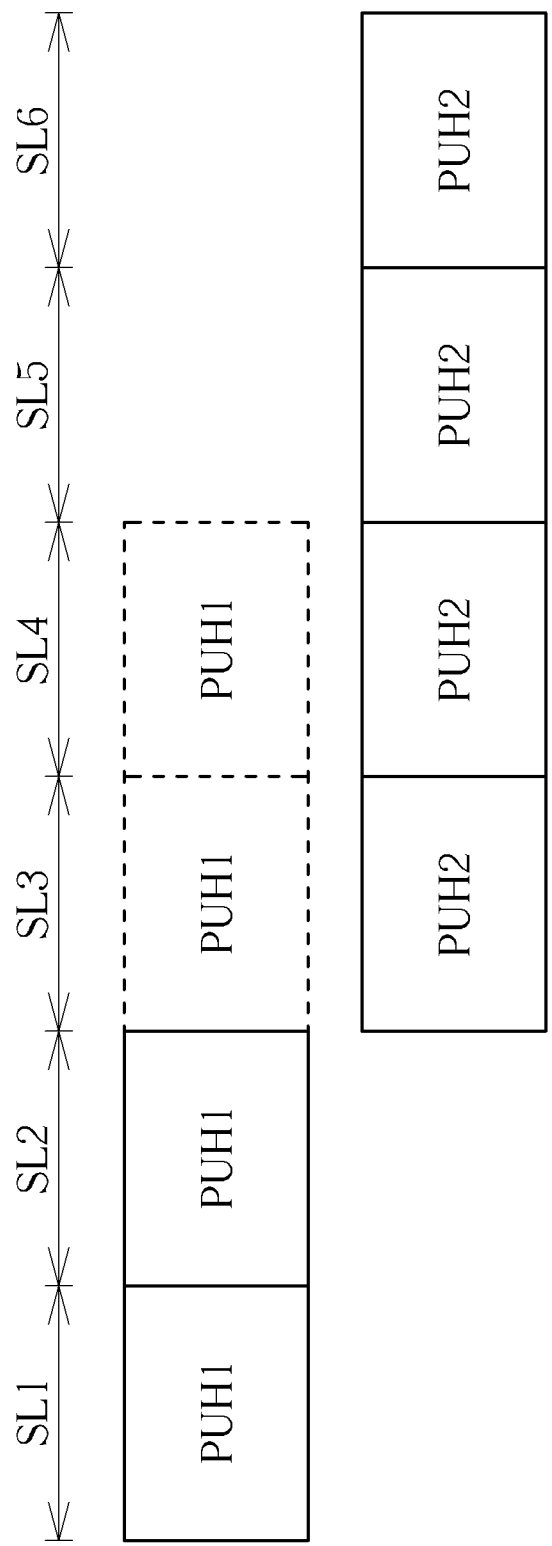
FIG. 8 is a schematic diagram of transmissions of PUCCHs according to an example of the present invention.

FIG. 8 is a schematic diagram of transmissions of PUCCHs according to an example of the present invention. The communication device transmits PUCCHs PUH1 and PUH2 in slots SL1-SL6 to the network. In detail, the communication device intends to transmit the PUCCH PUH1 in PRBs of the slots SL1-SL4 and to transmit the PUCCH PUH2 in PRBs of the slots SL3-SL6. Since the PUCCHs PUH1 and PUH2 are collided in the (overlapped) slots SL3 and SL4, the communication device drops the PUCCH PUH1 in the PRBs of the slots SL3 and SL4 according to the present invention. As a result, the communication device transmits the PUCCH PUH1 in the slots SL1-SL2 and transmits the PUCCH PUH2 in the slots SL3-SL6. Thus, the problem of the PUCCH collision is solved.

In one example, the communication device transmits the first PUCCH and the second PUCCH according to at least one of the following factors:

(1) A value r (e.g., a maximum coding rate for UCI) configured by the network for the second PUCCH.

(2) A (e.g., maximum) number of PRBs ($M_{RB}^{PUCCH}$) configured by the network (e.g., nrofPRBs) for the second PUCCH.

(3) A (e.g., maximum) number of slots ($N_{PUCCH}^{repeat}$) configured by the network for the second PUCCH.

(4) A number of slots for ($n_{PUCCH}^{repeat}$, $n_{PUCCH}^{repeat} \leq N_{PUCCH}^{repeat}$) transmitting the first PUCCH, before a slot n.

In one example, the communication device determines whether to transmit the second PUCCH in a slot n according to the following rule. If $(O_{UCI}+O_{CRC}) \cdot N_{PUCCH}^{repeat} \leq M_{RB}^{PUCCH} \cdot M_{SC,ctrl}^{PUCCH} \cdot M_{symb-UCI}^{PUCCH} \cdot Q_m \cdot n_{PUCCH}^{repeat} \cdot r$, the communication device does not transmit the second PUCCH in the slot n. Otherwise, the communication device transmits the second PUCCH in the slot n.

Figure 9:
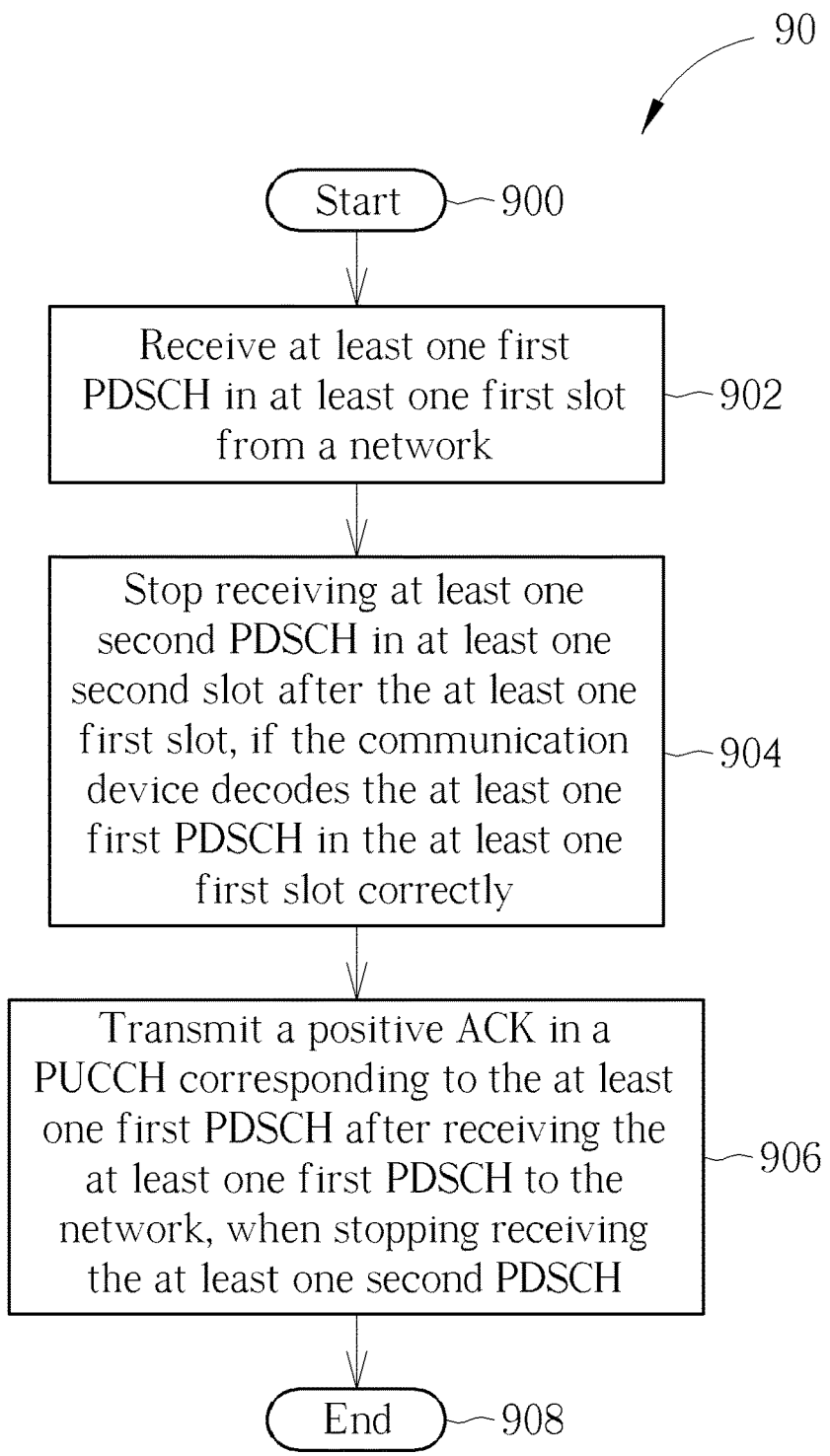
FIG. 9 is a flowchart of a process according to an example of the present invention.

FIG. 9 is a flowchart of a process 90 according to an example of the present invention. The process 90 may be utilized in a communication device, to handle a HARQ transmission, e.g., early data termination (EDT). The process 90 may be compiled into the program codes 214 and includes the following steps:

Step 900: Start.

Step 902: Receive at least one first PDSCH in at least one first slot from a network.

Step 904: Stop receiving at least one second PDSCH in at least one second slot after the at least one first slot, if the communication device decodes the at least one first PDSCH in the at least one first slot correctly.

Step 906: Transmit a positive acknowledgement (ACK) in a PUCCH corresponding to the at least one first PDSCH after receiving the at least one first PDSCH to the network, when stopping receiving the at least one second PDSCH.

Step 908: End.

According to the process 90, the communication device receives at least one first PDSCH in at least one first slot from a network. Then, the communication device stops receiving at least one second PDSCH in at least one second slot after the at least one first slot, if the communication device decodes the at least one PDSCH in the at least one first slot correctly. The communication device transmits a positive acknowledgement (ACK) in a PUCCH corresponding to the at least one first PDSCH after receiving the at least one first PDSCH to the network, when stopping receiving the at least one second PDSCH. That is, the communication device stops receiving rest PDSCH(s) and transmits the positive ACK to the network, when the at least one first PDSCH is received correctly. Thus, power consumption and resource can be saved at both the communication device and the network.

Realization of the process 90 is not limited to the above description. The following examples may be applied for realizing the process 90.

In one example, a (e.g., minimum) number of the at least one first slot is a fixed value or is configured by the network, e.g., by a DCI scheduling the PDSCH(s) or by a higher layer configuration. That is, when to stop receiving the PDSCH and to transmit the positive ACK is determined according to the fixed value or is configured by the network. The number of slots between the reception and the transmission can be termed as a slot offset. In one example, the PUCCH is determined according at least one of a slot offset or a PUCCH resource indicator.

In one example, the slot offset may be the offset between the first slot for receiving the PDSCH and the later slot where the communication device can correctly receive the PDSCH, i.e., the number of repetitions needed by the communication device for correctly receiving the PDSCH. In one example, the slot offset may be the offset between the first slot for receiving the PDSCH and the later slot where the communication device intends to transmit the positive ACK for the EDT.

In one example, the communication device may transmit the positive ACK in a third slot, wherein the third slot may be the last slot of the at least one first slot or may be a slot after the at least one first slot.

Figure 10:
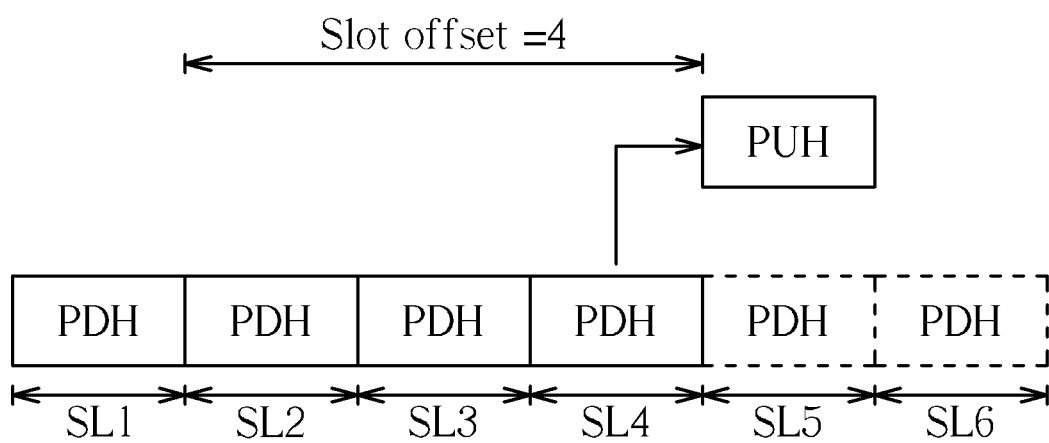
FIG. 10 is a schematic diagram of reception of a PDSCH according to an example of the present invention.

FIG. 10 is a schematic diagram of reception of a PDSCH according to an example of the present invention. The communication device intends to receive a PDSCH PDH in PRBs of slots SL1-SL6 from the network. In the present example, the communication device decodes the PDSCH PDH correctly, after receives the PDSCH PDH in the PRBs of the slots SL1-SL4. The communication device stops receiving the PDSCH PDH in the PRBs of the slots SL5-SL6, and power consumption for receiving the PDSCH PDH in the slots SL5-SL6 is saved. In addition, the communication device transmits a positive ACK in a PUCCH PUH in the slot SL4 to the network, to notify that the PDSCH PDH has been received correctly. The slot offset is 4 in the present example. Thus, the network does not transmit the PDSCH PDH in the slot SL6, and resource for the transmission may be saved.

Figure 11:
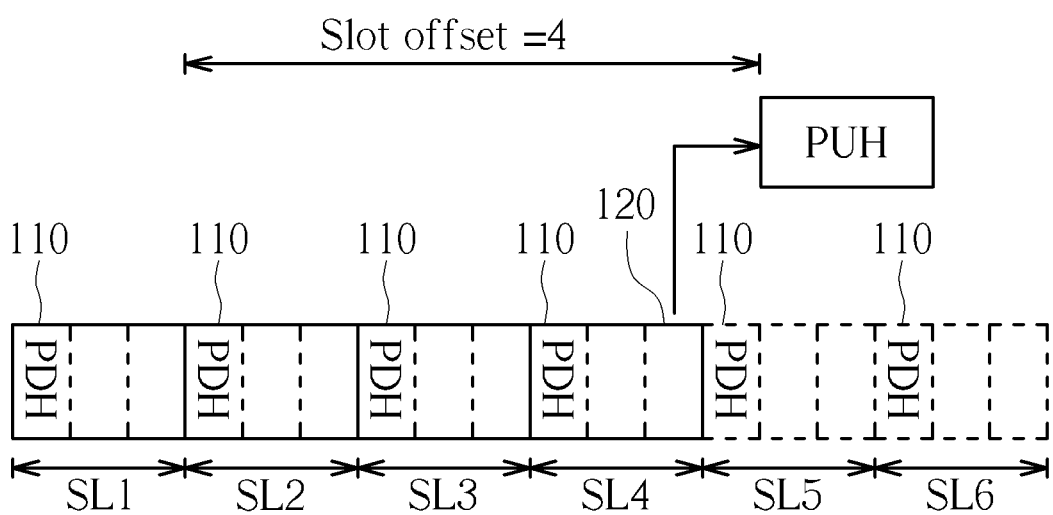
FIG. 11 is a schematic diagram of reception of a PDSCH according to an example of the present invention.

FIG. 11 is a schematic diagram of reception of a PDSCH according to an example of the present invention. The communication device intends to receive a PDSCH PDH in PRBs of slots SL1-SL6 from the network. Further, the PDSCH PDH is transmitted in partitions 110 of the slots SL1-SL6. That is, a slot may be divided into multiple partitions, and the PDSCH PDH may be only transmitted in the partitions 110.

In the present example, the communication device decodes the PDSCH PDH correctly, after receives the PDSCH PDH in the PRBs of the partitions 110 of the slots SL1-SL4. The communication device stops receiving the PDSCH PDH in the PRBs of the slots SL5-SL6, and power consumption for receiving the PDSCH PDH in the slots SL5-SL6 is saved. In addition, the communication device transmits a positive ACK in a PUCCH PUH in a partition 120 of the slot SL4 to the network, to notify that the PDSCH PDH has been received correctly. Note that the last PDSCH PDH received and the PUCCH PUH are in the same slot, since the PDSCH PDH only occupies part of the slot and the other part of the slot may be used for transmitting the PUCCH PUH. The slot offset is 4 in the present example. Thus, the network does not transmit the PDSCH PDH in the slot SL6, and resource for the transmission may be saved.

Figure 12:
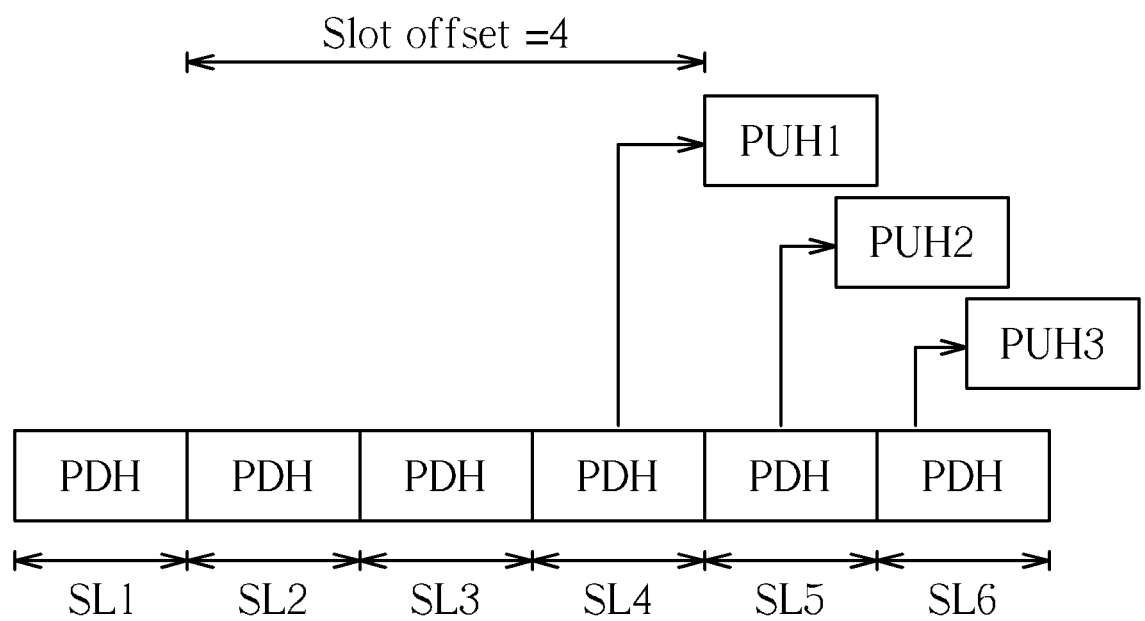
FIG. 12 is a schematic diagram of reception of a PDSCH according to an example of the present invention.

FIG. 12 is a schematic diagram of reception of a PDSCH according to an example of the present invention. The communication device intends to receive a PDSCH PDH in PRBs of slots SL1-SL6 from the network.

In one example, the communication device decodes the PDSCH PDH correctly, after receives the PDSCH PDH in the PRBs of the slots SL1-SL4. The communication device stops receiving the PDSCH PDH in the PRBs of the slots SL5-SL6. In addition, the communication device transmits a positive ACK in a PUCCH PUH1 in the slot SL4 to the network, to notify that the PDSCH PDH has been received correctly. The slot offset is 4 in the present example.

In one example, the communication device decodes the PDSCH PDH correctly, after receives the PDSCH PDH in the PRBs of the slots SL1-SL5. The communication device stops receiving the PDSCH PDH in the PRBs of the slot SL6. In addition, the communication device transmits a positive ACK in a PUCCH PUH2 in the slot SL5 to the network, to notify that the PDSCH PDH has been received correctly. The slot offset is 5 in the present example. In the above examples, resource for the transmission may be saved.

In one example, the communication device decodes the PDSCH PDH correctly, after receives the PDSCH PDH in the PRBs of the slots SL1-SL6. The communication device transmits a positive ACK in a PUCCH PUH3 in the slot SL6 to the network, to notify that the PDSCH PDH has been received correctly.

In the above examples, the PUCCHs PUH1, PUH2 and/or PUH3 may have the same time resource, e.g., the starting symbols of the time resource in a slot are the same and/or the lengths of the time resource in a slot are the same. In one example, the PUCCHs PUH1, PUH2 and/or PUH3 may have the same frequency resource, e.g., the starting PRBs in a slot are the same, and/or the lengths of the PRBs are the same in a slot). In one example, the PUCCHs PUH1, PUH2 and/or PUH3 may have different demodulation reference signal (DMRS) sequences. The DMRS sequences may be determined according to a slot offset and/or a radio resource control (RRC) configuration. In one example, the PUCCHs PUH1, PUH2 and/or PUH3 may be configured/indicated for multiple slot transmissions.

Figure 13:
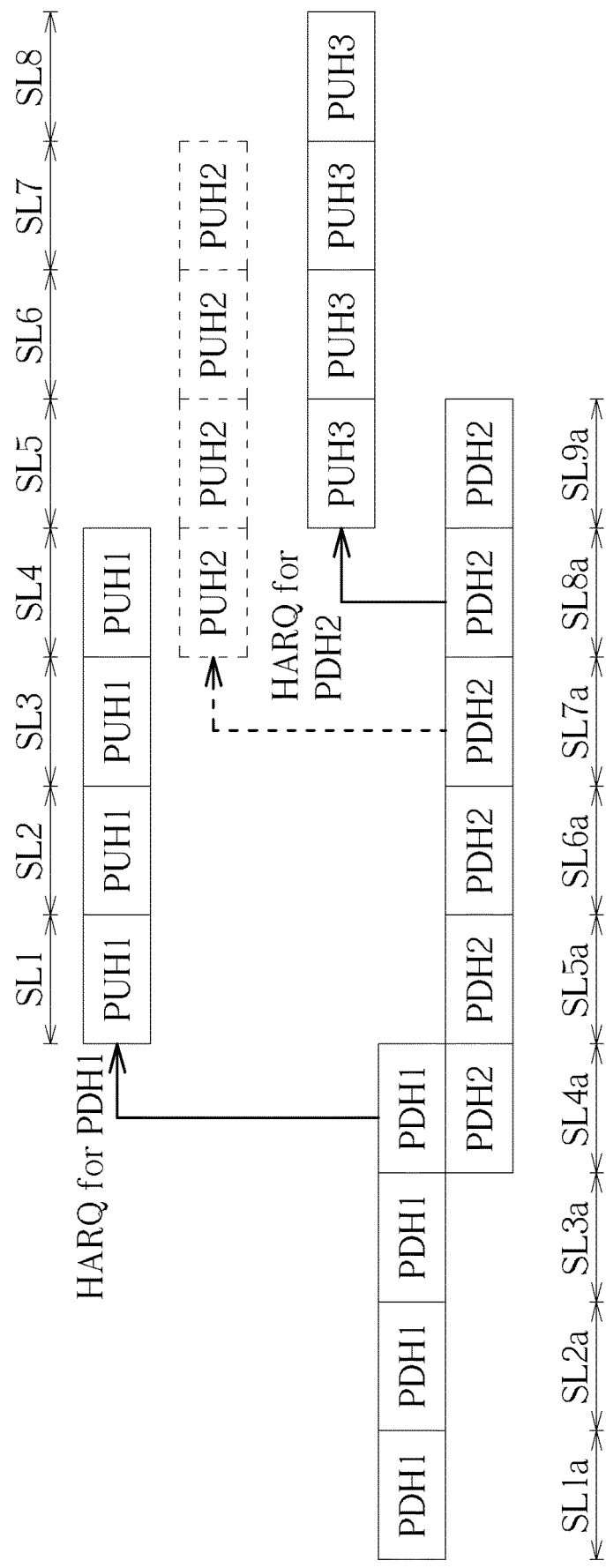
FIG. 13 is a schematic diagram of transmissions of PUCCHs according to an example of the present invention.

FIG. 13 is a schematic diagram of transmissions of PUCCHs according to an example of the present invention. The communication device receives PDSCHs PDH1 and PDH2 in slots SL1a-SL9a from the network. The PDSCHs PDH 1 and PDH2 may be transmitted by different serving cells. In the present example, the communication device decodes the PDSCH PDH1 correctly, after receives the PDSCH PDH1 in the PRBs of the slots SL1a-SL4a. The communication device decodes the PDSCH PDH2 correctly, after receives the PDSCH PDH2 in the PRBs of the slots SL4a-SL7a. Correspondingly, the communication device intends to transmit HARQs of the PDSCHs PDH1 and PDH2 in PUCCHs PUH1 and PUH2 in slots SL1-SL7 to the network. In detail, the communication device intends to transmit the HARQ for the PDSCH PDH1 in PRBs of the slots SL1-SL4 and to transmit the HARQ for the PDSCH PDH2 in PRBs of the slots SL4-SL7.

According to the present invention, the communication device defers the transmission of the HARQs of the PDSCH PDH2, since the PUCCH PUH1 collides with the PUCCH PUH2. The communication device transmits the HARQs of the PDSCH PDH2 in a PUCCH PUH3 in slots SL5-SL8. Thus, the HARQs of both the PDSCHs PDH1 and PDH2 can be transmitted completely without any collision. As a result, the problem of the PUCCH collision is solved.

Figure 14:
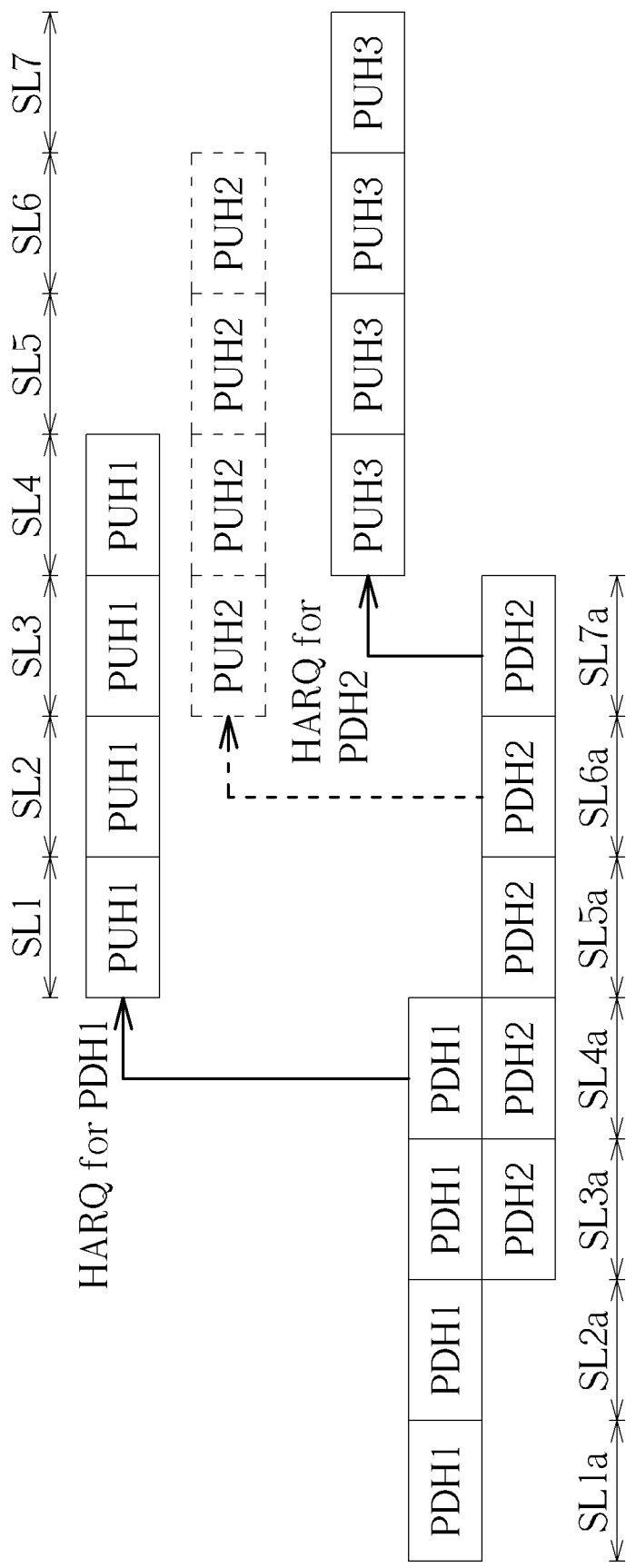
FIG. 14 is a schematic diagram of transmissions of PUCCHs according to an example of the present invention.

FIG. 14 is a schematic diagram of transmissions of PUCCHs according to an example of the present invention. The communication device receives PDSCHs PDH1 and PDH2 in slots SL1a-SL7a from the network. The PDSCHs PDH 1 and PDH2 may be transmitted by different serving cells. In the present example, the communication device decodes the PDSCH PDH1 correctly, after receives the PDSCH PDH1 in the PRBs of the slots SL1a-SL4a. The communication device decodes the PDSCH PDH2 correctly, after receives the PDSCH PDH2 in the PRBs of the slots SL3a-SL6a. Correspondingly, the communication device intends to transmit HARQs of the PDSCHs PDH1 and PDH2 in PUCCHs PUH1 and PUH2 in slots SL1-SL6 to the network. In detail, the communication device intends to transmit the HARQ for the PDSCH PDH1 in PRBs of the slots SL1-SL4 and to transmit the HARQ for the PDSCH PDH2 in PRBs of the slots SL3-SL6.

According to the present invention, the communication device defers the transmission of the HARQs of the PDSCH PDH2, since the PUCCH PUH1 collides with the PUCCH PUH2 in the slots SL3 and SL4. The communication device intends to transmit the HARQs of the PDSCH PDH2 in a PUCCH PUH3 in slots SL4-SL7. The PUCCH PUH1 still collides with the PUCCH PUH3 in the slot SL4, since the communication device may not be able to defer more slots. The communication device may apply any of the previous examples to solve the collision in the slot SL4. As a result, the problem of the PUCCH collision is solved.

It should be noted that FIGS. 12-14 are illustrated for cases where a PUCCH is transmitted in a first slot after a second slot for receiving a PDSCH. According to the example of FIG. 11, the first slot and the second slot may be the same slot, when the PDSCH is transmitted only in part of the second slot. Those skilled in the art can readily combine FIGS. 12-14 with FIG. 11 to obtain corresponding examples.

The operation of "determine" described above may be replaced by the operation of "compute", "calculate", "obtain", "generate", "output", "use", "choose/select" or "decide". The term of "according to" described above may be replaced by "in response to". The phrase of "associated with" described above may be replaced by "of" or "corresponding to". The term of "via" described above may be replaced by "on", "in" or "at".

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Examples of the hardware may include analog circuit(s), digital circuit(s) and/or mixed circuit(s). For example, the hardware may include ASIC(s), field programmable gate array(s) (FPGA(s)), programmable logic device(s), coupled hardware components or combination thereof. In another example, the hardware may include general-purpose processor(s), microprocessor(s), controller(s), digital signal processor(s) (DSP(s)) or combination thereof.

Examples of the software may include set(s) of codes, set(s) of instructions and/or set(s) of functions retained (e.g., stored) in a storage unit, e.g., a computer-readable medium. The computer-readable medium may include SIM, ROM, flash memory, RAM, CD-ROM/DVD-ROM/BD-ROM, magnetic tape, hard disk, optical data storage device, non-volatile storage unit, or combination thereof. The computer-readable medium (e.g., storage unit) may be coupled to at least one processor internally (e.g., integrated) or externally (e.g., separated). The at least one processor which may include one or more modules may (e.g., be configured to) execute the software in the computer-readable medium. The set(s) of codes, the set(s) of instructions and/or the set(s) of functions may cause the at least one processor, the module(s), the hardware and/or the electronic system to perform the related steps.

Examples of the electronic system may include a system on chip (SoC), system in package (SiP), a computer on module (CoM), a computer program product, an apparatus, a mobile phone, a laptop, a tablet computer, an electronic book or a portable computer system, and the communication device 20.

To sum up, the present invention provides a communication device and a method for handling a PUCCH collision between PUCCHs. The PUCCH collision is solved according to a proposed dropping rule, and the network is able to receive the PUCCHs correctly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a physical uplink (UL) control channel (PUCCH) collision, comprising:
at least one storage device; and
at least one processing circuit, coupled to the at least one storage device, wherein the at least one storage device stores instructions, and the at least one processing circuit is configured to execute the instructions of:
transmitting a first PUCCH in at least one first physical resource block (PRB) of at least one first slot to a network;
dropping a second PUCCH in at least one second PRB of at least one second slot, wherein the at least one second slot is overlapped with the at least one first slot; and
transmitting the second PUCCH in at least one third PRB of at least one third slot to the network, wherein the at least one third slot is after the at least one first slot;
wherein a first priority of the first PUCCH is higher than a second priority of the second PUCCH;
wherein a number of the at least one third PRB is determined according to a higher layer signal and at least one of a first coding rate of UL control information (UCI) in the second PUCCH, a second coding rate of the UCI with the PUCCH collision, a first number of PRBs configured for the second PUCCH, a second number of PRBs configured for the second PUCCH with the PUCCH collision or a number of slots configured for the second PUCCH;
wherein the first PUCCH comprises a first hybrid automatic repeat request (HARQ), and the second PUCCH comprises a second HARQ.

2. The communication device of claim 1, wherein the second PUCCH collides with the first PUCCH in the at least one second slot.

3. The communication device of claim 1, wherein the communication device transmits the second PUCCH in the at least one third PRB via a power boosting.

4. The communication device of claim 1, wherein the at least one third PRB comprises all PRBs for the second PUCCH configured by the network.

5. The communication device of claim 1, wherein the instructions further comprise:
transmitting the second PUCCH in at least one fourth PRB of at least one fourth slot to the network, wherein the at least one fourth slot is after the at least one first slot.

6. The communication device of claim 1, wherein the instruction of transmitting the second PUCCH in the at least one third PRB of the at least one third slot to the network comprises:
dropping at least one first UL control information (UCI) in the second PUCCH in the at least one third PRB in the at least one third slot; and
transmitting at least one second UCI in the second PUCCH in the at least one third PRB in the at least one third slot.

7. The communication device of claim 6, wherein at least one first priority of the at least one first UCI is lower than at least one second priority of the at least one second UCI.

8. A communication device for handling a physical uplink (UL) control channel (PUCCH) collision, comprising:
at least one storage device; and
at least one processing circuit, coupled to the at least one storage device, wherein the at least one storage device stores instructions, and the at least one processing circuit is configured to execute the instructions of:
transmitting a first PUCCH in at least one first physical resource block (PRB) of at least one first slot to a network;
dropping the first PUCCH in at least one second PRB of at least one second slot; and
transmitting a second PUCCH in at least one third PRB of at least one third slot to the network, wherein the at least one third slot is overlapped with the at least one second slot;
wherein a first priority of the first PUCCH is lower than a second priority of the second PUCCH;

wherein a number of the at least one third PRB is determined according to a higher layer signal and at least one of a first coding rate of UL control information (UCI) in the second PUCCH, a second coding rate of the UCI with the PUCCH collision, a first number of PRBs configured for the second PUCCH, a second number of PRBs configured for the second PUCCH with the PUCCH collision or a number of slots configured for the second PUCCH;

wherein the first PUCCH comprises a first hybrid automatic repeat request (HARQ), and the second PUCCH comprises a second HARQ.

9. The communication device of claim 8, wherein the second PUCCH collides with the first PUCCH in the at least one second slot.

10. The communication device of claim 8, wherein the instructions further comprise:
dropping the second PUCCH in at least one fourth PRB of at least one fourth slot, wherein the at least one fourth slot is overlapped with the at least one first slot and is before the at least one third slot.

11. The communication device of claim 10, wherein the second PUCCH collides with the first PUCCH in the at least one fourth slot.

12. The communication device of claim 8, wherein the communication device drops the first PUCCH in the at least one second PRB in the at least one second slot according to a processing time of the second PUCCH or a periodicity of the second PUCCH.

13. The communication device of claim 8, wherein the communication device drops the first PUCCH in the at least one second PRB in the at least one second slot according to at least one of a coding rate of UL control information (UCI) in the first PUCCH, a number of PRBs configured for the first PUCCH or a number of slots configured for the first PUCCH.

14. The communication device of claim 8, wherein the communication device drops the first PUCCH in the at least one second PRB in the at least one second slot according to at least one of a coding rate of UCI in the second PUCCH, a number of PRBs configured for the second PUCCH, or a number of slots configured for the second PUCCH.

15. The communication device of claim 8, wherein the instruction of transmitting the first PUCCH in the at least one first PRB of the at least one first slot to the network comprises:
dropping at least one first UCI in the first PUCCH in the at least one first PRB in the at least one first slot; and
transmitting at least one second UCI in the first PUCCH in the at least one first PRB in the at least one first slot.

16. The communication device of claim 15, wherein at least one first priority of the at least one first UCI is lower than at least one second priority of the at least one second UCI.

17. The communication device of claim 8, wherein the instruction of transmitting the second PUCCH in the at least one third PRB of the at least one third slot to the network comprises:
dropping at least one third UCI in the second PUCCH in the at least one third PRB in the at least one third slot; and
transmitting at least one fourth UCI in the second PUCCH in the at least one third PRB in the at least one third slot.

18. The communication device of claim 17, wherein at least one third priority of the at least one third UCI is lower than at least one fourth priority of the at least one fourth UCI.

* * * * *